United States Patent [19]

Erni et al.

[11] Patent Number: 4,461,744
[45] Date of Patent: Jul. 24, 1984

[54] APPARATUS FOR GENERATING OZONE BY AN ELECTRIC DISCHARGE

[75] Inventors: Peter Erni, Baden; Ulrich Kogelschatz, Hausen; Sigfrid Strässler, Wettingen; Hans-Jürg Wiesmann, Seegräben, all of Switzerland

[73] Assignee: BBC Brown, Boveri & Company, Limited, Baden, Switzerland

[21] Appl. No.: 331,751

[22] Filed: Dec. 17, 1981

[30] Foreign Application Priority Data

Dec. 23, 1980 [CH] Switzerland ............... 9515/80

[51] Int. Cl.³ .................................. B01J 19/12
[52] U.S. Cl. ................... 422/186.18; 422/186.15; 422/186.16
[58] Field of Search .......... 422/186.15, 186.16, 422/186.18, 186.19

[56] References Cited

U.S. PATENT DOCUMENTS

| | | | |
|---|---|---|---|
| 2,248,713 | 7/1941 | Locke | 422/186.15 |
| 2,326,601 | 8/1943 | Arff | 422/186.15 |
| 3,198,726 | 8/1965 | Trikilis | 422/186.18 |
| 3,565,776 | 2/1971 | Arff | 422/186.18 |
| 3,843,882 | 10/1974 | Presnetsov et al. | 422/186.15 |
| 4,027,169 | 5/1977 | Lowther | 422/186.16 |
| 4,051,043 | 9/1977 | Harter et al. | 422/186.16 |
| 4,293,775 | 10/1981 | Feuerstake et al. | 422/186.18 |
| 4,320,301 | 3/1982 | Kogelschatz et al. | 422/186.18 |
| 4,385,261 | 5/1983 | Kogelschatz et al. | 315/170 |

FOREIGN PATENT DOCUMENTS

| | | | |
|---|---|---|---|
| 2150919 | 4/1972 | Fed. Rep. of Germany | 422/186.18 |
| 2541906 | 3/1977 | Fed. Rep. of Germany | 422/186.16 |
| 2658913 | 7/1978 | Fed. Rep. of Germany | 422/186.15 |
| 2934327 | 2/1981 | Fed. Rep. of Germany | |
| 2949501 | 5/1981 | Fed. Rep. of Germany | 422/186.16 |
| 54-107894 | 8/1979 | Japan | 422/186.15 |
| 54-133494 | 10/1979 | Japan | 422/186.18 |
| 6900758 | 7/1970 | Netherlands | 422/186.16 |

Primary Examiner—Benjamin R. Padgett
Assistant Examiner—Howard J. Locker
Attorney, Agent, or Firm—Oblon, Fisher, Spivak, McClelland & Maier

[57] ABSTRACT

An ozone-generating element is disclosed which has a tube ozonizer (1), consisting essentially of an outer metal tube (3) forming one electrode, and of a glass tube (4) which is located coaxially therein and is spaced from it and the inner surface of which is provided with an electrically conductive layer (5) serving as the other electrode. Ozone is formed by pulse discharges with a passive, plate-like spark gap (12) with a defined response voltage serving as a switching element. The tube ozonizer (1) is fed by a low-frequency current source (7) via a high-voltage transformer (9), to the secondary winding (10) of which a storage capacitor (11) is connected. A series of embodiments is proposed, and in these part or all the constructional elements of the critical pulse circuit form a constructional unit with, or integrated into, the tube ozonizer (1). In this way, it is possible to produce pulse circuits of extremely low inductance which lead to up to a doubling of the total efficiency of ozone generation. By means of the highest integration stage which is considered especially advantageous, it becomes possible to convert conventional ozone generators fed with alternating current to pulse operation, without having to carry out expensive conversion and adaptation work, especially in terms of circuitry.

6 Claims, 13 Drawing Figures

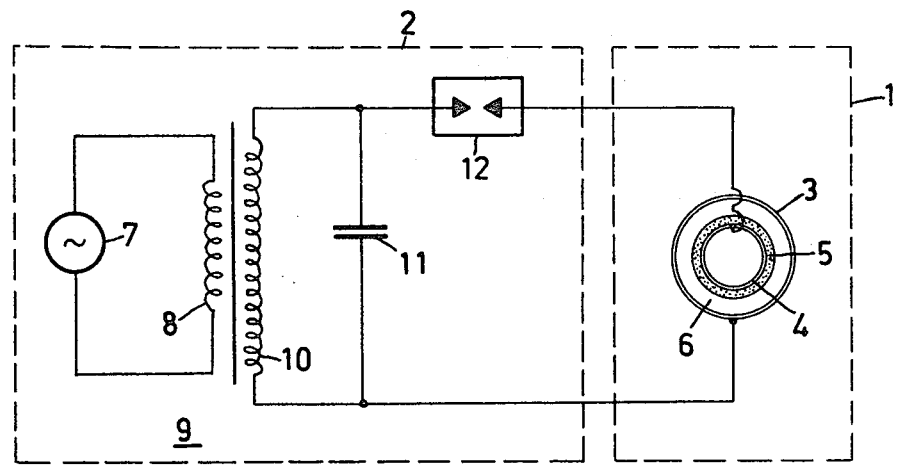
FIG.1
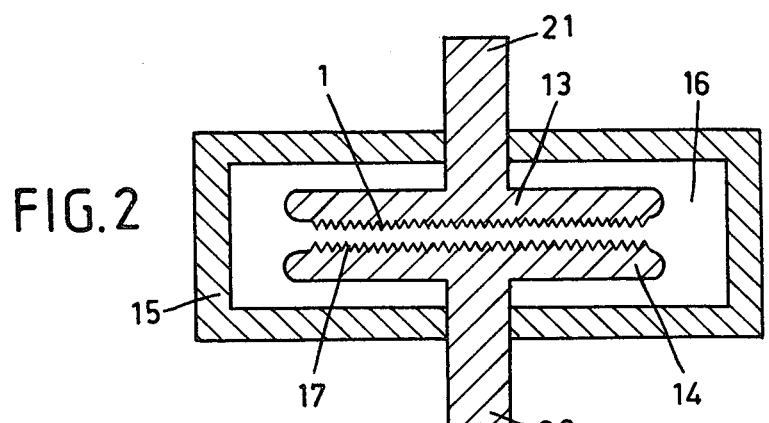
FIG.2
FIG.3
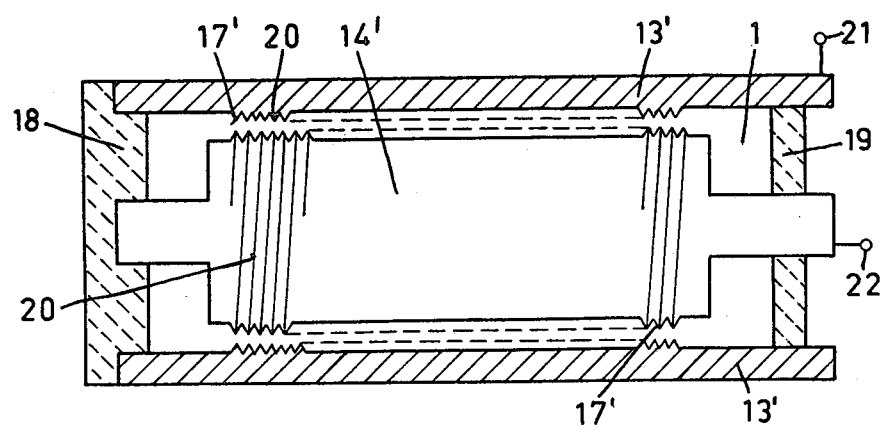

APPARATUS FOR GENERATING OZONE BY AN ELECTRIC DISCHARGE

BACKGROUND OF THE INVENTION

1. Field of the Invention

The invention relates to an apparatus for generating ozone by an electric discharge, with a tube ozonizer consisting of a first tubular electrode and a second likewise tubular electrode which is provided with a dielectric layer which faces the first electrode and, between itself and the other electrode, leaves free a cylindrical discharge space through which an oxygen-containing gas can be passed, and also with a supply system consisting of a high-voltage transformer which is fed by low frequency alternating current and the secondary winding of which is connected in parallel both to a storage capacitor and to the series connection of a spark gap and the ozonizer.

2. Description of the Prior Art

Apparatuses of this type for generating ozone have been proposed, for example, in German patent application P 29 34 327.9 or in Swiss patent application No. 7101/79-8.

In addition to the "conventional" feeding of ozonizers with low-frequency alternating current of sine-wave or square-wave form with frequencies between 50 Hz and several kHz, ozone-generating apparatuses operated with pulse-wave currents are becoming increasingly important. Thus, an appliance with rotating electrodes is described in German Offenlegungsschrift 2,652,283. Here, the spark discharge is produced by bringing the rotating electrodes of the spark gap nearer to fixed electrodes. In this case, the spark-gap electrodes are connected to the current supply by means of sliding contacts. German patent application P 29 49 501.0 or Swiss patent application 9753/79-6 also proposes an apparatus for generating ozone, in which the ozonizer is fed via rotating spark gaps.

However, to meet the requirements for a long life and operating safety, the aim is to replace rotating spark gaps by purely electrical/electronic designs. The proposal in the patent applications mentioned above as directed toward this purely electrical design. In order to generate ozone, a cylindrical discharge channel is subjected to a low-frequency electrical alternating-voltage signal which consists of a sine-wave voltage with positive and negative peak values below the starting voltage of the ozonizer and of voltage pulses which are superimposed on the sine-wave voltage essentially at its maximum and minimum values to form a voltage increase leading to arc-through in the ozonizer. Among other things, a spark gap preferably integrated in the ozonizer is used as a switching element for the arc-through of the pulses.

SUMMARY OF THE INVENTION

Accordingly, one object of the present invention is to provide a novel apparatus for generating ozone, which, in terms of the circuitry outlay for feeding the ozonizer, ensures an even greater simplification and therefore an increased operating safety and longer life of the apparatus as a whole.

In a generating apparatus of aforementioned type, this object is achieved, according to the invention, due to the fact that the spark gap is of plate-like, passive design and has a defined response voltage which is below the peak value of the secondary voltage of the high-voltage transformer, but above the starting voltage of the ozonizer from rest, and that at least the storage capacitor or the passive spark gap form a constructional unit with the ozonizer.

Of fundamental importance here is the use of a plate-like spark gap having a defined response voltage, the basic construction of this having become known, for example, from German Offenlegungsschrift 2,828,409 in connection with overvoltage arresters.

According to a first preferred embodiment of the subject of the invention according to this invention, the spark gap has two active electrode surfaces which are located opposite one another at a distance and are provided with a plurality of elevations and which have faces rotationally symmetrical to the electrode axis and parallel to one another, the coaxial electrodes being located in a tubular insulating housing.

The present invention describe a series of electrode configurations which are especially suitable for the purpose according to the invention.

A feature common to all the designs is that they allow for a response voltage which is constant even over a relatively long operating time because of the large active electrode surface and the plurality of elevations located opposite one another.

BRIEF DESCRIPTION OF THE DRAWINGS

A complete appreciation of the invention and many of the attendant advantages thereof will be readily obtained as the same becomes better understood by reference to the following detailed description when considered in connection with the accompanying drawings, wherein:

FIG. 1 shows a diagrammatic representation of an apparatus for generating ozone, with a supply system which comprises a spark gap, FIG. 2 shows an exemplary embodiment of the invention with a plate-shaped spark gap, FIG. 3 shows an exemplary embodiment of a tubular spark gap.

DESCRIPTION OF THE PREFERRED EMBODIMENT

Figure 4:
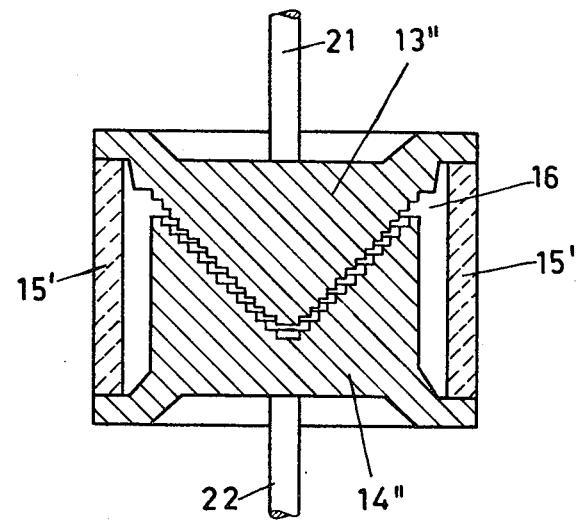
FIG. 4 shows an exemplary embodiment of a spark gap with electrodes, the active electrode surfaces of which are designed as cone-shell faces.

Referring now to the drawings, wherein like reference numerals designate identical or corresponding parts throughout the several views, and more particularly to FIG. 1 thereof, an ozone generator is illustrated diagramatically. It consists essentially of an ozone-generating element, the ozonizer 1, and of a supply system 2. The ozonizer 1 is designed as a tube ozonizer and comprises an outer metal tube 3 and an inner coaxial glass tube 4 coaxial. The inner face of the inner glass tube 4 is provided with an electrically conductive layer 5 which is made, for example, by the flame-spraying or vapour-deposition of aluminium. Between the inner and outer tubes there is the cylindrical discharge space 6 through which an oxygen-containing gas, for example air, can be passed.

The supply system 2 comprises an alternating-current source 7, the output current of which has a square, trapezoidal or sine wave shape and the frequency of which is adjustable. The alternating-current source 7 is connected to the primary winding 8 of a high-voltage transformer 9. A storage capacitor 11 is connected in parallel to the secondary winding 10 of the high-voltage transformer 9. One terminal of the secondary winding leads directly to the outer electrode of the ozonizer 1, that is to say to the metal tube 3, whilst the inner electrode of the ozonizer, the layer 5, is connected via a passive spark gap 12 to the other terminal of the secondary winding 10.

The mode of operation of the apparatus according to FIG. 1 emerges from the following:

Assuming that an oxygen-containing gas or pure oxygen flows through the discharge space 6, the current source 7 supplies a sine-wave alternating current of between 50 Hz and several kHz. The storage capacitor 11 is charged during the first quarter period. The voltage applied between its terminals is also applied, in practically the same amount, between the electrodes of the spark gap 12, whilst the voltage between the electrodes 3 and 4 of the ozonizer is substantially less than the voltage at the storage capacitor 11, since the capacitance of the spark gap 12 is substantially less than the total capacitance of the ozonizer 1. Now when the voltage at the spark gap 12 exceeds its response voltage which should be higher than the starting voltage for the ozonizer 1, the spark gap 12 causes an arc-through, and as a result the full voltage of the storage capacitor becomes effective at the ozonizer, so that this also starts. Because of the steep voltage rise after the arc-through of the spark gap, the ozonizer 1 is likewise started very quickly. In practice, it has been possible to measure leading edges of approximately 20 nsec., as a result of which homogeneous discharge is achieved in the gas mixture, thus leading to a substantially more effective formation of ozone in the discharge space 6 than in the case of conventional feeding with alternating current.

The current pulse lasts for less than 1 microsecond, typically 100 nanoseconds, and ends before the discharge can change to a spark or arc discharge. As a result, local heating of the gas in the discharge chamber and consequently destruction of the ozone formed is prevented.

The processes described are repeated at the start of the second half cycle of the supply voltage. It should be pointed out that the described method of generating sharp-edged pulses at the ozonizer is largely independent of the wave form of the supply voltage, and the supply voltage can therefore also have a square, delta or trapezoidal wave form. It is important that the peak value of the voltage should be above the starting voltage of the ozonizer 1 and of the spark gap 12.

The frequency of the supply voltage can also lie within wide limits. Since the ozone generation rate is approximately proportional to the frequency of the supply voltage, it is advantageous if the frequency of the current supplied by the current source 7 is made adjustable. In this case, a particularly suitable current source is a mains-supplied inverter with a direct-current intermediate circuit, as is generally known from static-converter technology and is therefore not described in any more detail here.

For energy reasons, it is expedient if the capacitance of the storage capacitor 11 is chosen so as to be close to the dielectric capacitance of the ozonizer 1.

The optimum functioning of the above-described apparatus for generating ozone is largely influenced by the constancy in time of the response voltage of the spark gap 12. Passive spark gaps with only two point electrodes located opposite each other cannot be used in practice, since the electrodes and the effective distance between the electrodes vary as a result of the discharge processes in such a way, that the response voltage fluctuates within wide limits.

The spark gap 12 illustrated in FIG. 2 consists of two spark-gap electrodes 13, 14 which are designed as disc-shaped plates, made, for example, of copper or graphite, which are spaced at a particular distance from one another. The distance between the plates can be 1 to 5 mm. The plates can be made very simply and at favourable cost. They are surrounded by an insulating housing 15 made, for example, of plastic or ceramic. The inner space 16 of the housing is filled with a gas, for example an argon/hydrogen mixture or even air. The surfaces of the plates located opposite one another are provided with circular concentric grooves 18 which are cut into the surfaces by turning. Plate-shaped spark gaps with 1-2 grooves per mm have proved very advantageous. The sharpness of the grooves, which is defined by the angle formed by the flanks of the grooves, is preferably 60°. Because of the grooves, ridges 17 are obtained, with a ridge height of 0.5 to 2 mm, preferably 0.5 mm. The sharp-edged ridges are surrounded by the gas on their flanks and thus precisely define the starting voltage, even after relatively long use, independently of the polarity, and are characterized by relatively low consumption by burning in the case of a large number of switching operations of up to more than $10^{10}$. During the arc-through of the spark gap, an ignition spark is obtained, specifically between the ridge combs located opposite and nearest to one another. By means of the ridge length, which can be between 10 cm and 10 m, or by means of the number of grooves and the choice of materials having different resistances to consumption, including inter alia, sinter alloys, tungsten silver and molybdenum, different lifetimes can be set, since, when a groove or part of it is consumed, enough other grooves, which the ignition spark can pass across, are available. Furthermore, the abovementioned materials copper and graphite have the advantage that the consumed portion is still metallic and consequently the electrodes are virtually regenerated.

In the spark gap 12 illustrated in FIG. 3, the spark-gap electrodes are designed as a metal tube 13', made, for example, of copper, and as a metal cylinder 14', likewise made, for example, of copper, which is located coaxially in the interior of the latter at a specific distance from it. The metal tube 13' serves, at the same time, as the housing of the spark gap and is closed at both ends by covers 18, 19. Furthermore, the covers 18, 19 serve to retain the metal cylinder 14. A spark gap of this type can be switched, together with a cylindrical capacitor, into a circuit of extremely low inductance, as will be explained later. Threads 20 are cut, by turning, into the surfaces of the electrodes facing one another, with the result that the ridges 17' are obtained. The number and sharpness of the ridges can be set very simply to the desired value by appropriate adjustment of the advancing movement and choice of the cutting steel on the lathe. Advantageously, the thread has approximately 1–2 turns per mm. The ridge height is around 0.5 mm. The sharpness of the thread, which is defined by the angle formed by the flanks of the ridges, amounts to 60°. The arc-through of the spark gaps according to FIGS. 2 and 3 takes place, at a precisely defined voltage value, by means of an ignition spark which passes across the particular ridge combs located opposite and nearest to one another. The flashover travels statistically over the entire thread.

The spark gap according to FIG. 4 has a tubular housing 15' made of insulating material, for example, ceramic. Two hermetic closures in the form of two cup-shaped metallic electrodes 13" and 14" project into the housing 15. The margins of the cups 13" and 14" are connected to the insulating tube 15' by means of a vacuum-tight metal/ceramic connection using metal solder. Electrode leads 21, 22 extending outwards are attached on the inside of the cup-shaped depressions. Their surfaces located opposite one another and directed into the interior of the housing are of conical shape. One electrode 13" tapers into a cone which projects into a hollow cone of the other electrode 14". This gives rise to two electrode surfaces in the form of cone shells which are opposite one another at the same distance everywhere. The opening angle of the cones is preferably 90°. Thus, the active electrode surface is greater by approximately the factor $\sqrt{2}$ than would be possible in the case of plane-parallel electrode surfaces (see FIG. 2). To increase the active electrode surfaces further, the two cone-shell surfaces are subdivided in the form of steps by coaxial gradations. Moreover, this design of the spark gap has the advantage that vapour-deposited components of the electrode surface cannot settle so easily on the insulating tube 15'.

The starting voltage is defined substantially more precisely, in comparison with plane electrodes, for the following reason:

It is not possible to polish plane electrodes so finely that coarse structuring of the surface is avoided. The homogeneity of the discharge is impaired by impurities of varying dimensions, that is to say, for example, the ignition spark passes across at a specific, particularly coarsely structured place on the surface over a relatively long period of time not precisely defined. Consumption by burning of the surface then takes place unevenly, and the lifetime of the electrodes and the stability of the starting voltage are impaired accordingly.

On the other hand, when the electrodes are provided with ridges which all have the same dimensions, this results in a plurality of inhomogeneities of the electrical field, which, on average, define the starting voltage more precisely than is the case with plane electrodes. Consumption by burning of the ridges takes place very uniformly, as a result of which the stability of the starting voltage is maintained for a substantially longer time than in the case of plane electrodes.

Seen in terms of time and place, the ignition spark travels statistically over all the ridges. On an average in terms of time and place, the accuracy of the starting voltage is increased because of this.

Figure 5:
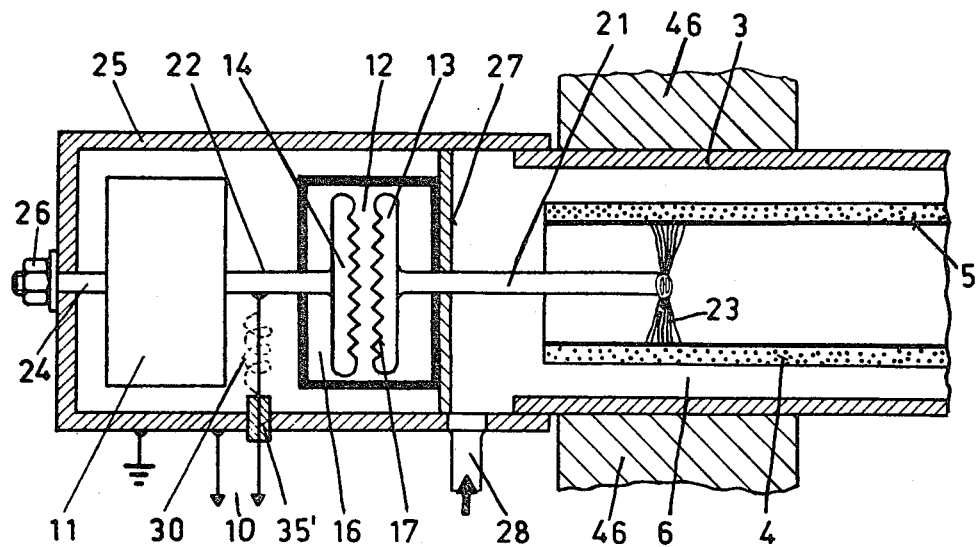
FIG. 5 shows a first exemplary embodiment of an apparatus for generating ozone, in which the storage capacitor and the spark gap are accommodated in a common housing which is pushed onto the ozonizer.

In the exemplary embodiment of an apparatus for generating ozone, as illustrated in FIG. 5, the ozonizer 1, the spark gap 12 and the storage capacitor 11 form a constructional unit. The layer 5 acting as an inner electrode is connected via a contact brush 23 to one lead 21 of the spark gap 12. The spark gap itself has a construction as was described in relation to FIG. 2 or FIG. 4. The other lead 22 of the spark gap leads to the storage capacitor 11 which is designed here as a cylindrical capacitor with axial leads. The lead of the capacitor 11 which faces away from the spark gap 12 is designed as a bolt 24 and serves for fastening the storage capacitor 11 to the housing 25 of the constructional unit by means of a nut 26.

The constructional unit is connected electrically to the secondary winding 10 of the high-voltage transformer 9 at the housing 25, on the one hand, and at the lead 22 of the spark gap 12, on the other hand. This connection being made via a high-voltage duct 35, in the wall of the housing 25. An intermediate wall 27 separates the part of the housing in which the storage capacitor 11 and the spark gap 12 are accommodated from the ozonizer 1.

Figure 13:
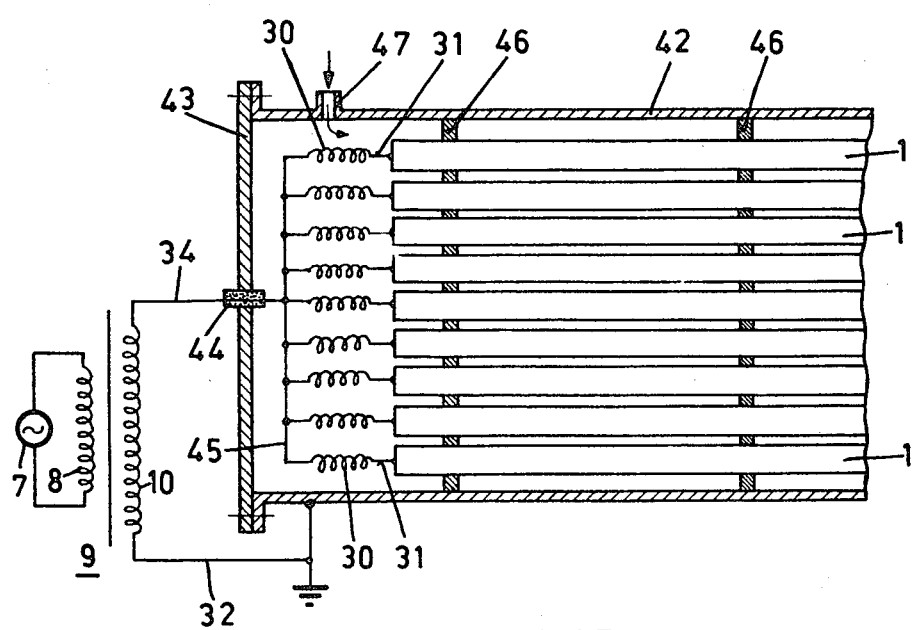
FIG. 13 shows a section through a boiler with a plurality of tube ozonizers.

The housing 25 of the constructional unit has an inside diameter matching the outside diameter of the metal tube 3. Thus, the housing can be pushed onto the ozonizer in a simple way and can be fastened there in a known way. FIG. 5 shows, in addition, a support 46 for the ozonizer tube which will be discussed further below (FIG. 13).

The oxygen-containing gas is fed into the discharge space of the ozonizer via a connection 28 in the end of the housing on the ozonizer side. The gas enriched with ozone leaves the discharge space at the end (not shown) of the metal tube 3.

The following FIGS. 6 to 11 illustrate diagrammatically and in a simplified manner further exemplary embodiments of the subject of the invention, identical parts being provided with the same reference numerals as in FIGS. 1 to 5.

Figure 6:
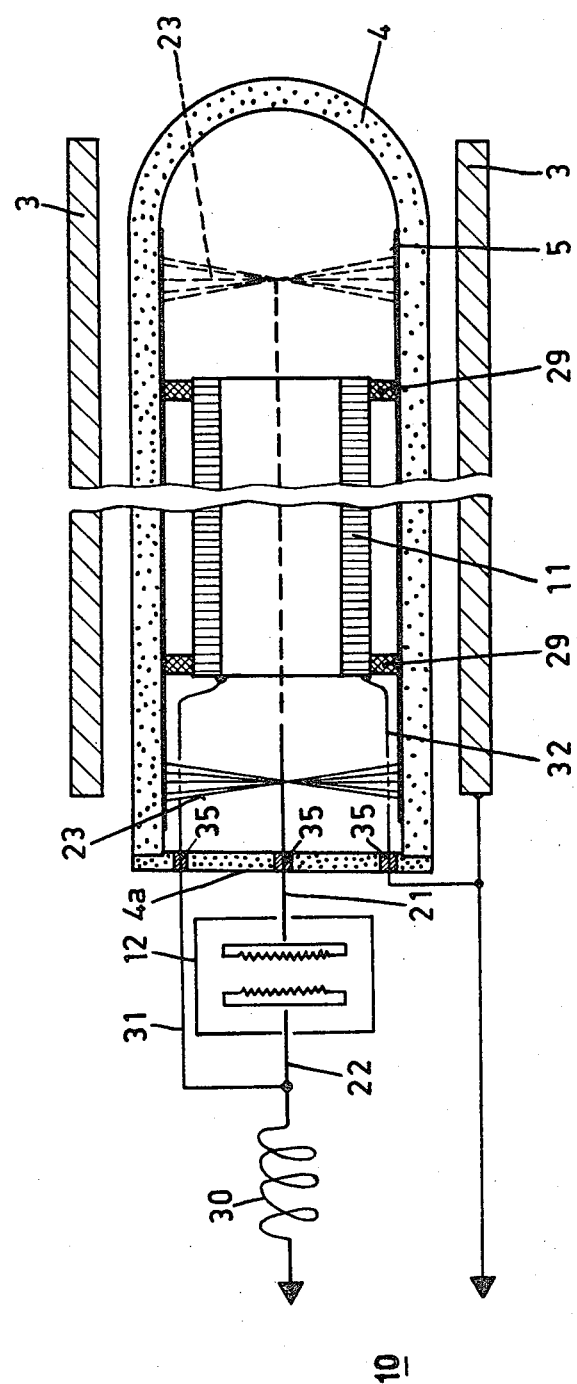
FIG. 6 shows a second exemplary embodiment of an apparatus for generating ozone, in which the storage capacitor is located within the tubular inner electrode, but the spark gap is located outside the inner electrode.

In the design according to FIG. 6, the storage capacitor 11 is designed as a tubular capacitor and is located completely on the inside of the glass tube 4 which is closed on the feed side by a cover 4a. Supports 29 made of insulating material ensure coaxial positioning relative to the glass tube 4. The spark gap 12, which can be designed as a plate-shaped spark gap according to FIG. 2 or as a conical spark gap according to FIG. 4, lies outside outside the glass tube 4. The electrical connection between the layer 5 acting as an inner electrode and one lead 21 of the spark gap 12 is made in a similar way to FIG. 5 by means of a contact brush 23. The other lead 22 of the spark gap 12 is guided, on the one hand, via a decoupling coil 30 to one terminal of the secondary winding 10 of the high-voltage transformer 9 and, on the other hand, via a connecting line 31 to one lead of the storage capacitor 11. The other lead of the storage capacitor 11 is guided to the metal tube 3 which is, in turn, connected to the other terminal of the secondary winding 10 of the high-voltage transformer 9.

In the apparatus illustrated, the lines 31 and 32 leading to the storage capacitor 11 are passed, insulated, through the contact brush. This can be avoided if the contact brush 23 is located in the space between the storage capacitor 11 and the conventionally closed end of the glass tube 4. The lead 21 then passes coaxially through the tubular capacitor. This alternative form is illustrated in FIG. 6 by a representation of the contact brush in broken lines.

Figure 7:
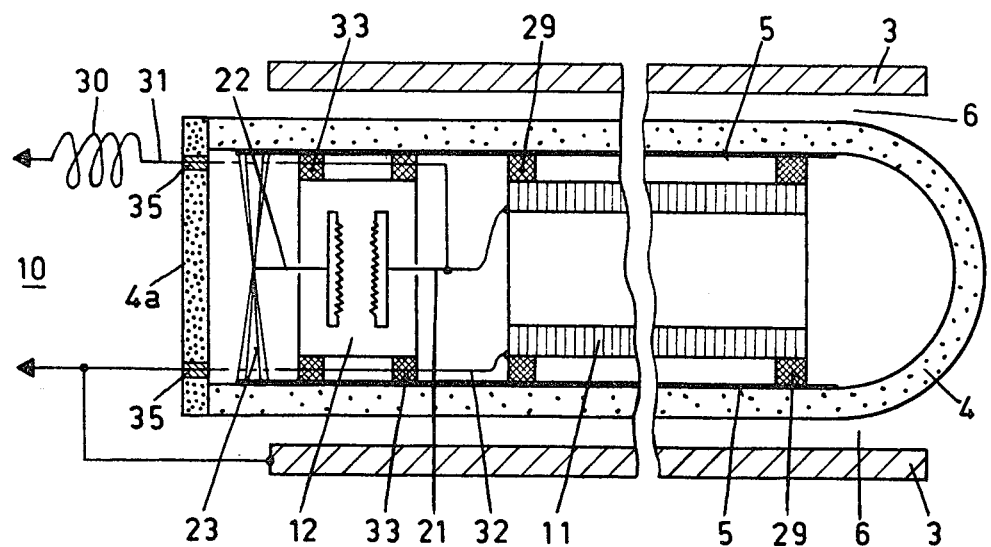
FIG. 7 shows a third exemplary embodiment of an apparatus for generating ozone, with a storage capacitor located within the inner electrode and designed as a tubular capacitor, and with a plate-shaped spark gap.

In the embodiment according to FIG. 7, in addition to the storage capacitor, the spark gap 12 is also integrated into the glass tube 4 with the cover 4a. The two parts are retained by supports 29 and 33 respectively. The electrical connection 31 between the decoupling coil 20 and the connecting point of one lead 21 of the spark gap 12 and one lead of the tubular capacitor 11 is passed, insulated, through the contact brush 23 and also penetrates through the supports 33 of the spark gap 12. In the same way, the line 32 passes from the other lead of the storage capacitor 11 through the supports 33 mentioned and, insulated, through the contact brush 23 to the metal tube 3 which is connected to one terminal of the secondary winding 10 of the high-voltage transformer 9, whilst the free end of the decoupling coil 30 is guided to the other terminal of the secondary winding 10.

Figure 8:
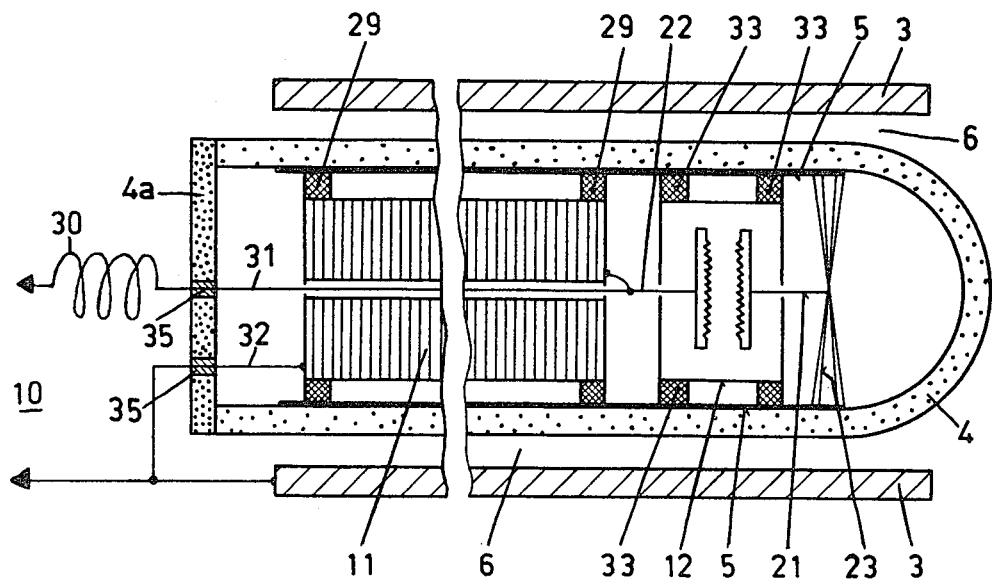
FIG. 8 shows an embodiment conforming to that shown in FIG. 7, the storage capacitor being designed as a coaxial wound capacitor.

In the embodiment according to FIG. 8, the spark gap 12 and the storage capacitor 11 are likewise located on the inside of the glass tube 4 with a cover 4a. Seen from the open end of the glass tube 4, the storage capacitor 11 designed as a wound capacitor is followed by the spark gap 12 and the contact brush 23. The connecting line between the decoupling coil 30 and is guided coaxially through the storage capacitor 11 and is connected to the latter at the lead of the storage capacitor on the spark gap side and to one lead 22 of the spark gap 12. The other lead 21 of the spark gap passes to the contact brush 23. The other lead of the storage capacitor 11 is connected via the line 32 to the metal tube 3 which is itself connected to one terminal of the secondary winding 10 of the high-voltage transformer 9. Its other terminal passes to the free lead of the decoupling coil 30.

In comparison with the embodiment according to FIG. 7, the embodiment according to FIG. 8 offers, among other things, the advantage of a simplified wiring arrangement on the inside of the glass tube 4.

Figure 9:
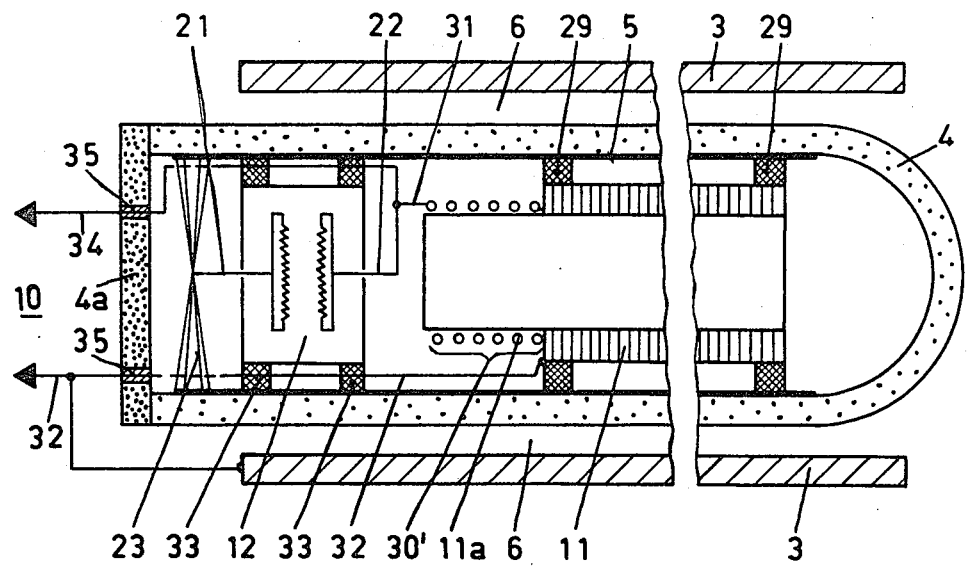
FIG. 9 shows a further exemplary embodiment of an apparatus for generating ozone, in which, in addition to the spark gap and storage capacitor, a decoupling inductance is also located within the inner electrode.
Figure 10:
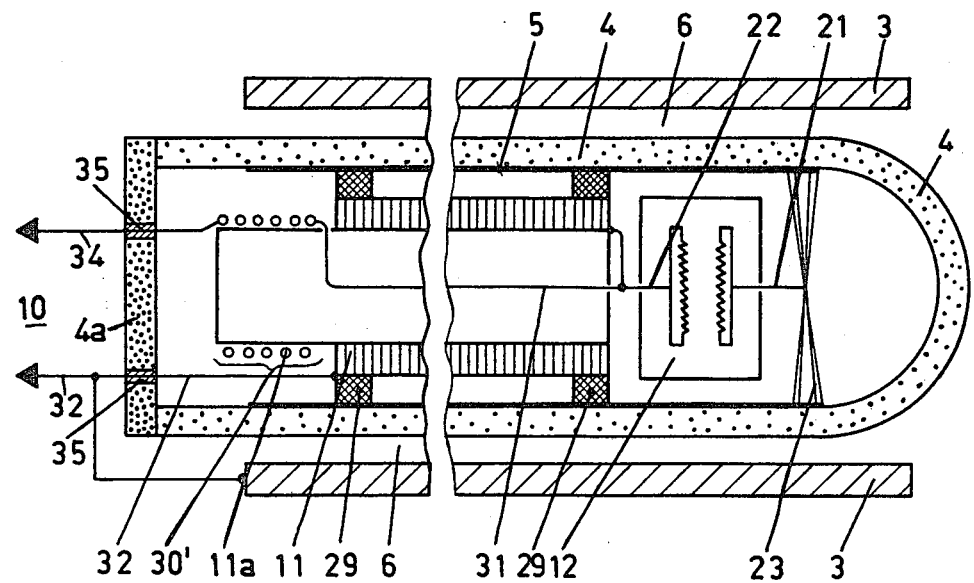
FIG. 10 shows a modification of the apparatus according to FIG. 9, with an arrangement, different from this, of a storage capacitor, spark gap and decoupling inductance.

FIGS. 9 and 10 illustrate embodiments of an apparatus for producing ozone, the basic construction of which corresponds to that of those according to FIGS. 7 and 8, but in which the degree of integration is further increased by also installing the decoupling coil 30' in the interior of the glass tube 4.

In both alternative forms, the storage capacitor 11 is designed as a tubular capacitor, the supporting tube of the covering being extended. The turns of the decoupling coil 30' are attached to this extension designated by 11a in FIGS. 9 and 10. In the case of FIG. 9, the directly adjacent leads of the coil 30' and tubular capacitor are connected directly to one another. Otherwise, the construction corresponds to that according to FIG. 7.

In the case of the apparatus according to FIG. 10, one lead of the coil 30' and one lead of the tubular capacitor 11 pass directly to the outside, and in the glass tube 4 closed on both sides, at the end facing away from the spark gap 12, the leads 32 and 34 are guided via ducts 35 directly to the secondary winding 10 of the high-voltage transformer 9.

Particularly the arrangements according to FIGS. 9 and 10 have a construction of extremely low inductance which is located in the pulse branch of the supply system and which meets the requirements for extremely sharp leading edges of the current pulses to which the ozonizer discharge space 6 is subjected.

Furthermore, the very construction illustrated particularly in FIGS. 9 and 10 and described above offers the advantage of a simple design, great convenience in servicing and adherence to the best possible operating conditions even after the exchange of one or more constructional units, since the electrical connections need to be made only in that part of the supply system which is non-critical from the point of view of current pulses.

Figure 11:
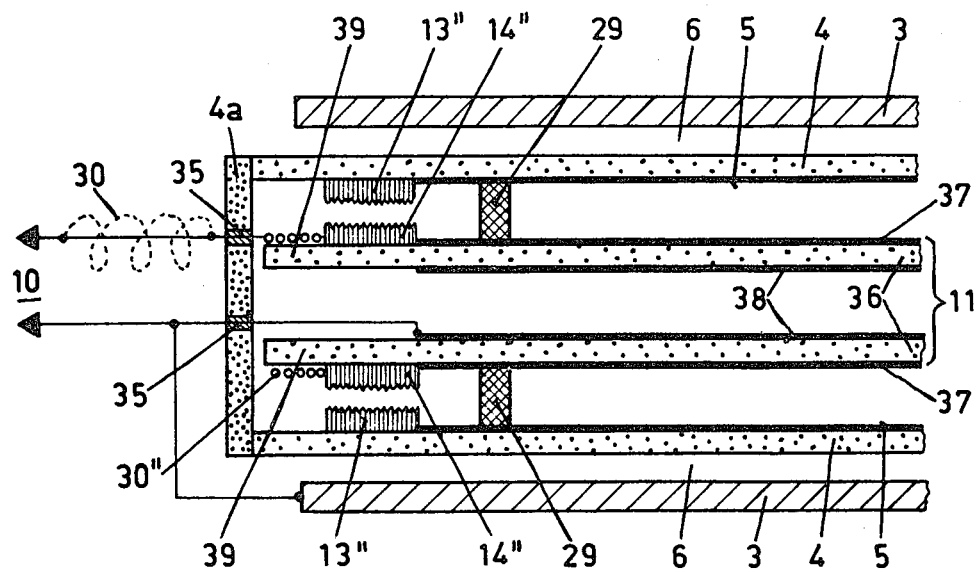
FIG. 11 shows, finally, an exemplary embodiment of an apparatus for generating ozone, with a tubular spark gap located within the tubular inner electrode, the storage capacitor likewise being located in the interior of the inner electrode.

The same advantages can also be achieved by means of an embodiment of the invention in which the spark gap is designed according to FIG. 3 and is as illustrated in a simplified manner in FIG. 11. Here, the storage capacitor 11 used is a type of tubular capacitor which consists of a supporting tube 36 made of dielectric material with conductive coatings 37 and 38 applied to the inside and outside. An inner tubular spark gap electrode 14" which is connected electrically to the outer coating 37, is attached to the end of the supporting tube 36 on the supply side. An outer electrode 13", which surrounds the inner electrode 14" annularly and at a distance and which is connected electrically to the layer 5 on the glass tube 4, serves as a spark-gap counterelectrode. The two electrodes 13" and 14" act as a tubular spark gap, as was described in more detail in relation to FIG. 3. Furthermore, the turns of a decoupling coil 30" are attached to the end 39 of the tube 36, on the supply side, the coil end directed towards the interior of the supporting tube 36 being connected directly to the inner electrode 14". The ozonizer is supplied, on the one hand, via the free end of the coil 30" and, on the other hand, via the electrically interconnected parts of the inner coating 38 of the storage capacitor 11 and the metal tube 3. For the sake of completeness, it should be mentioned that the tube 36 is spaced and retained on the inside of the glass tube 4 by means of supports 29. An advantageous fact in the embodiment according to FIG. 11 is, in addition to a simple construction of low inductance and easy exchangeability, that, with simple means, a storage capacitor 11 can be integrated into the ozonizer, that is to say into the interior of the glass tube 4, so that the condition of equal capacitance of the storage capacitor and the dielectric capacitance of the ozonizer is satisfied, when the dielectric constant and the thicknesses of the glass tube 4 and the tube 36 made of dielectric material are selected appropriately, since the storage capacitor can be made practically of the same axial length as the glass tube 4. No more details are needed to explain the fact that the glass tube 4 is closed at both ends, the electrical leads preferably being guided by means of ducts 41 through the cover 40 on the supply side.

FIG. 11 also illustrates that the decoupling coil 30 can also be located outside the glass tube 4. This is shown by representing the coil 30 in broken lines.

Figure 12:
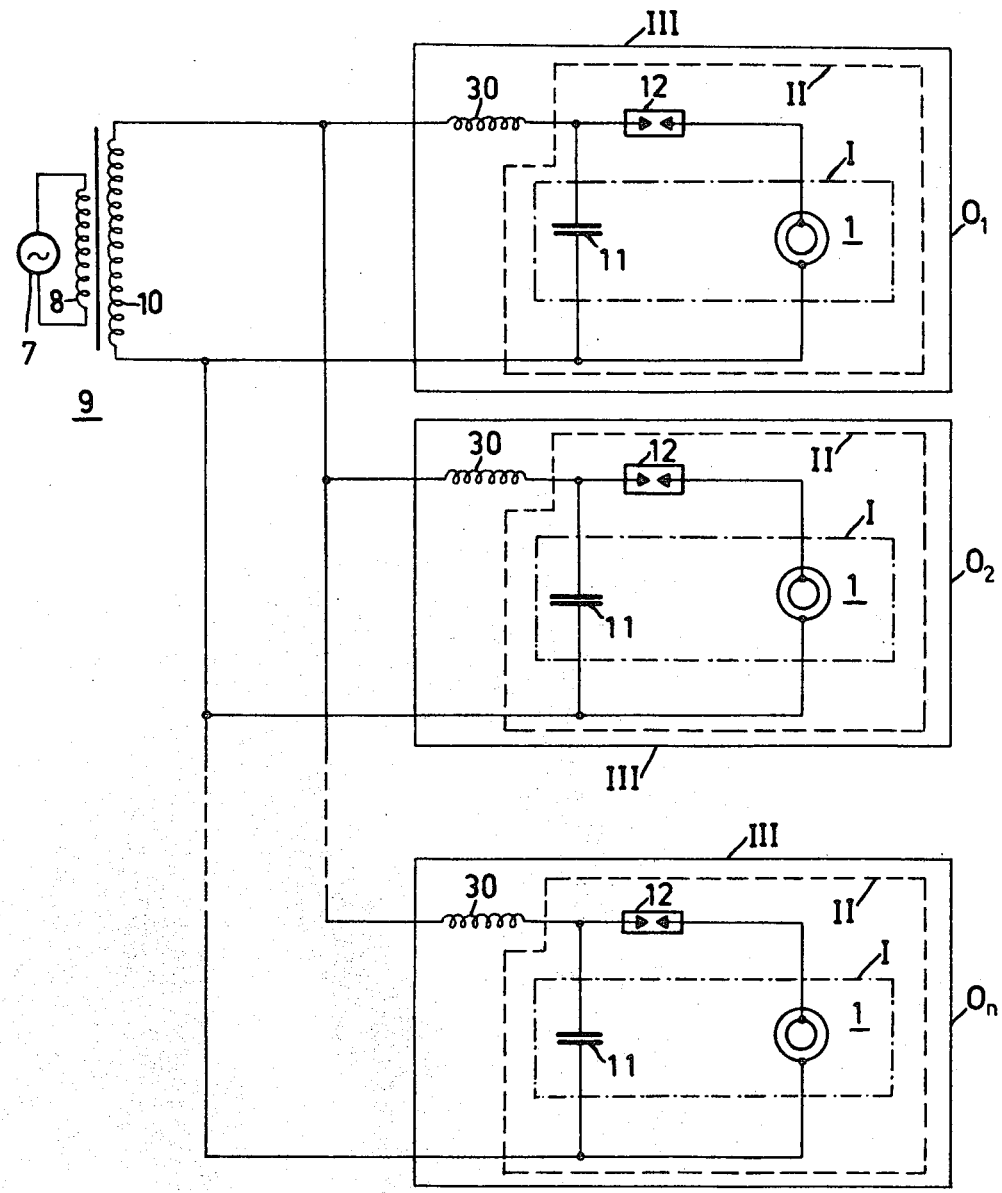
FIG. 12 shows a circuit arrangement for feeding a plurality of ozonizers from a common high-voltage transformer.

Conventionally, a plurality of ozonizers is fed from a common high-voltage transformer. The basic wiring diagram for an arrangement of this type is represented by way of example in FIG. 12. A plurality of ozonizers 1, with associated spark gaps 12, storage capacitors 11 and decoupling coils 30, is connected to the high-voltage transformer 9 with a primary winding 8 and a secondary winding 10, each unit being designated as a whole by $O_1, O_2, \ldots, O_n$. The various integration stages are identified by the numerals I, II and III, the constructional parts combined together to form a particular constructional unit being illustrated by broken lines and by dot-and-dash lines respectively. In the integration stage I, the actual ozonizer 1 and the associated storage capacitor 11 are combined into a constructional unit, for example according to FIG. 6. In the next higher integration stage II, the actual ozonizer 1, the storage capacitor 11 and the spark gap 12 form the constructional unit, and here, alternatively, the storage capacitor 11 and spark gap 12 are arranged, according to FIG. 5, as a unit which can be attached onto the tube ozonizer or the constructional element mentioned, within the ozonizer 1 (FIG. 7 and FIG. 8). In the last integration stage III which is considered as the best possible solution at the present time, the associated decoupling coil 30' is also integrated in the tube ozonizer 1.

The above-described integration of a part or all the parts of the pulse branch so far presents no difficulties, since tube ozonizers produced in practice have a length of between 1 and 2 m, with a clear inside diameter of the glass tube of between 40 and 50 mm, and the constructional elements, namely the storage capacitor 11, spark gap 12 and, if appropriate, the coil 30', actually fit into the glass tube 4.

In constructed installations for generating ozone, a plurality of tube ozonizers is accommodated in a common boiler. FIG. 13 shows a greatly simplified representation of a boiler 42 of this type, with an electrical supply via a high-voltage transformer 9. The boiler 42 is closed at both ends by a cover 43 through which a high-voltage lead 34 is passed via a high-voltage duct 44. In conventional apparatuses belonging to the state of the art, the high-voltage lead 34 passes, in the boiler interior—if appropriate, with a busbar 45 being interposed—directly to the inner electrodes (not shown) of the tube ozonizers 1. The outer electrodes (metal tubes) are at ground potential. They are connected electrically to the boiler housing in a simplified manner via supporting plates 46 provided with aligned apertures. The oxygen-containing gas is supplied at the connection 47. The gas enriched with ozone leaves the boiler at the other end (not shown) of the boiler 42.

Whereas, in the known installations, the connection between the busbar 45 and the inner electrodes is a direct connection, in FIG. 13 decoupling coils 30 are interposed between the busbar 45 and the high-voltage leads 31 of the tube ozonizers 1 and decouple the high-voltage transformer 9 from the ozonizers in terms of its pulses, if the individual ozonizers 1 are installed without integrated decoupling coils according to the designs of FIGS. 5, 7, 8 and 11. In the case of ozonizers according to FIGS. 9, 10 and 11, these decoupling coils are omitted completely. In embodiments where, in addition to the decoupling coil, the spark gap 12 is also located outside the ozonizer 1, an arrangement of the storage capacitor 11, spark gap 12 and decoupling coil 30 according to FIG. 5 (the alternative form shown in broken lines) is possible.

A substantial advantage of the invention, especially in the designs according to FIGS. 5, 9, 10 and 11, is to be seen in the fact that conventional ozone generators, which are fed with low-frequency alternating current directly from a high-voltage transformer, can be converted into so-called pulse ozonizers without great expense. This can be done simply by exchanging the ozone-generating elements for those according to the invention. In this way, efficiencies up to more than 10% in the case of air operation or 20% in the case of Oz operation can be achieved. Existing control and/or regulating devices for the ozone generation rate, which are based on changing the frequency of the primary voltage of the high-voltage transformer, can continue to be operated unchanged. It is merely necessary to ensure that the response voltage of the spark gap 12 is calculated in relation to the secondary voltage so that multiple ignitions of the spark gap 12 and/or of the ozonizer 1 are avoided during a half cycle of the secondary voltage, since multiple ignitions of this type can, under certain circumstances, impair the efficiency of the ozone-generating element.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for generating ozone by an electric discharge comprising:

a tube ozonizer having a first outer tubular electrode and a second, likewise tubular inner electrode having a dielectric layer which faces said first electrode and, between said electrodes a cylindrical discharge space, through which an oxygen-containing gas can be passed;

a supply system consisting of a high-voltage transformer which is fed by low-frequency alternating current between mains frequency and 10 kH with the secondary winding connected in parallel both to a storage capacitor and to the series connection of a spark gap and the tube ozonizer, wherein said spark gap is of plate-like, passive design and has a defined response voltage which is below the peak value of the secondary voltage of the high-voltage transformer, but above the starting voltage of the ozonizer from rest, and wherein said storage capacitor and said passive spark gap are integrated to form a unitary construction which is designed as an exchangable unit which can be slidably removably connected to said outer electrode of said ozonizer.

2. An apparatus according to claim 1, wherein said spark gap has two active electrode surfaces which are located opposite one another at a distance and which are provided with a plurality of elevations and on which there are faces rotationally symmetrical to the electrode axis and parallel to one another with the coaxial electrodes being located in a tubular insulated housing.

3. An apparatus according to claim 1, wherein the spark gap has two active electrode surfaces which are located opposite one another at a distance and are provided with a plurality of elevations and on which there are faces rotationally symmetrical to the electrode axis and parallel to one another with one of said coaxial electrodes forming part of said unitary construction.

4. An apparatus according to claim 2 or 3, wherein said electrodes are made disc-shaped, and at least one of the active electrode surfaces is provided with a plurality of concentric ridges.

5. An apparatus according to claim 2 or 3, wherein the active electrode surfaces are designed as cone-shell faces with equal opening angles of the cone, one of said electrodes tapering into a cone, while the other of said electrodes takes the form of a hollow cone.

6. An apparatus according to claim 2 or 3, wherein said electrodes are designed as coaxial metal tubes at least one of the active electrode surfaces facing one another provided with encircling or helical ridges.

* * * * *